Oct. 30, 1962  R. THIER ETAL  3,061,731
APPARATUS FOR DETECTING OPTICALLY ASCERTAINABLE
IMPERFECTIONS ON SHEET MATERIAL
Filed Dec. 15, 1960  3 Sheets-Sheet 1

RICHARD THIER
WALTER MAYER
RUDOLF MEINL
INVENTORS

BY Walter S. Blenton
ATTORNEY

United States Patent Office 3,061,731
Patented Oct. 30, 1962

3,061,731
APPARATUS FOR DETECTING OPTICALLY ASCERTAINABLE IMPERFECTIONS ON SHEET MATERIAL
Richard Thier, Buderich, near Dusseldorf, and Walter Mayer and Rüdolf Meinl, Furth, Germany, assignors to Feldmuhle Papier- und Zellsloftwerke A.G., Dusseldorf-Oberkassel, Germany, a corporation of Germany
Filed Dec. 15, 1960, Ser. No. 76,062
Claims priority, application Germany Dec. 22, 1959
16 Claims. (Cl. 250—219)

Our present invention relates to an apparatus for detecting spots, wrinkles, pinholes and other imperfections in a strip of sheet material, such as paper, by means of an electro-optical scanning device which focuses a narrow luminous spot upon the sheet surface and measures the intensity of its scattered reflection.

An apparatus of this description is the subject matter of commonly assigned application Ser. No. 805,237, filed April 9, 1959, by Richard Thier, one of the present applicants, now Patent No. 3,023,900 issued March 6, 1962. In accordance with the disclosure of that patent, the reflected light energy is converted into an electric voltage by one or more photoelectric receivers, advantageously designed as photomultiplier tubes, whose output is fed to a clipper stage which is suitably biased to pass only those fault-indicating pulses which exceed a predetermined threshold value.

The cutoff level of the clipper stage, which determines the sensitivity of the apparatus, depends on the range of variations to which the intensity of the reflected light is subject under normal conditions not amounting to the scanning of an imperfection. It is clear that these normal variations must not give rise to a defect signal if an intolerably large proportion of rejects is to be avoided. Furthermore, a certain safety factor must be provided if faulty operation due to minor variations in the electric system, such as fluctuations in the supply voltage or aging of amplifier tubes and the like, is to be prevented.

It is, therefore, the general object of our present invention to provide means for increasing the sensitivity of a fault-detecting apparatus of this character without risking the rejection of specimens which would be classified as normal with visual sorting.

Another object, ancillary to the one stated above, is to provide means for substantially eliminating the influence of changing circuit parameters upon the operation of the apparatus.

In the use of such apparatus for the testing of either a continuously moving web or a succession of discrete sheets, scanning is most conveniently carried out by letting the luminous spot sweep transversely across the path of the advancing sheet material at high relative speed so that successive scanning lines touch or slightly overlap one another. Advantageously, from the viewpoint of sharp focusing, the spot is produced by an optical system of large focal length which directs the rays of a stationary light source upon a moving reflector such as a rotating multi-faceted mirror whereby a converging bundle of these rays is caused to sweep repeatedly across the sheet surface. The spot may cross the lateral edges of the sheet or may be confined by opaque shielding to an area within these edges; in either case the initial impingement of the focused light rays upon the sheet surface will be gradual, as will be their disappearance from this surface at the end of the sweep. This results in a tapering of the reflected light energy at both ends of a scanning line and, consequently, in the generation of periodic pulses similar to those which indicate an imperfection. Though the amplitude of these pulses may be modified through the provision of suitably reflecting strips alongside the moving sheet material, they cannot be suppressed entirely and their presence will be a determining factor in regard to the location of the cutoff level of the clipping stage.

It is, accordingly, a more specific object of our present invention to provide means for rendering the defect indicator of the aforedescribed apparatus insensitive to parasitic pulses occurring at the begining and at the end of the scanning sweep.

It is highly desirable that a surface-testing apparatus of this type respond not only to localized imperfections (e.g. small black spots) of a predetermined degree of contrast with respect to the normal sheet surface, but also to more extensive off-shade regions (e.g. large grey spots) of lesser contrast or to a high concentration of such minor blemishes within a predetermined area. In the testing of discrete sheets, for example, it will be convenient to measure the cumulative effect of all imperfections not individually giving rise to voltage pulses exceeding the cut-off level of the clipper stage and to produce an imperfection signal whenever this cumulative value exceeds a predetermined magnitude for a single sheet. Electrically this can be implemented by means of a suitable integrating circuit which is discharged after the passage of each sheet under the control of a beam of light passing through the inter-sheet gap; unless, however, a separate photoelectric receiver is used for this light beam, false operation could result from the intermittent loading of the system by the control pulse due to such beam. The invention, therefore, has as a further object the provision of means for cumulatively measuring the imperfections of an individual sheet without impairment of either the sensitivity or the operating stability of the apparatus.

In accordance with this invention we provide a network, hereinafter referred to as a clamping stage, which periodically (preferably at least once during each line scan) receives a control pulse from the same photoelectric system which is used to measure the reflectivity of the sheet surface, this control pulse being produced by a reflection of the light of the scanning source at a surface of constant brightness so that the amplitude of the pulse is dependent only upon the intensity of the source and other potentially variable parameters of the system. The control pulse is used to establish in the clamping stage a level of reference potentials determining the threshold beyond which a signal indicative of a surface imperfection becomes operative, either alone or as part of an accumulation of such signals, to actuate a detector circuit for apprising an operator of the detection of a fault and/or to actuate a sorting mechanism for automatically removing the tested sheet. The detector circuit advantageously includes a discriminator stage, which produces signals of varying amplitude in response to pulses exceeding the threshold established by the clamping stage, and a clipper stage, which determines the minimum amplitude such signal (or a combination thereof) must have in order to indicate a defect. Between these stages we prefer to insert an integrating stage for measuring cumulative subcritical deviations of the scanning signal from its normal level over a predetermined period, this period advantageously coinciding with the scanning of a complete single sheet in a system designed for the testing of a succession of such sheets.

The invention also envisages the provision of means synchronized with the scanning beam for rendering the clamping stage susceptible to the control pulse whenever that beam passes over the reflecting surface of constant brightness, preferably with simultaneous inactivation of the detector circuit of the system so as to avoid false operation thereof. While there exist various possibilities for deriving a suitable gating signal from the motion of a rotating reflector, we prefer to use an optical coupling which enables highly accurate synchronization to be realized in a relatively simple manner. More particularly, in accordance with another feature of the invention, we provide one or more auxiliary photoelectric receivers adapted to be triggered by secondary reflections of a scanning beam as the latter passes through one or more predetermined positions in its path, e.g. upon approaching or reaching the reference surface of constant brightness on one side of the sheet material to be tested, and/or upon approaching or passing the opposite edge of that sheet material.

The invention will be described in greater detail with reference to the accompanying drawing in which.

Figure 1:
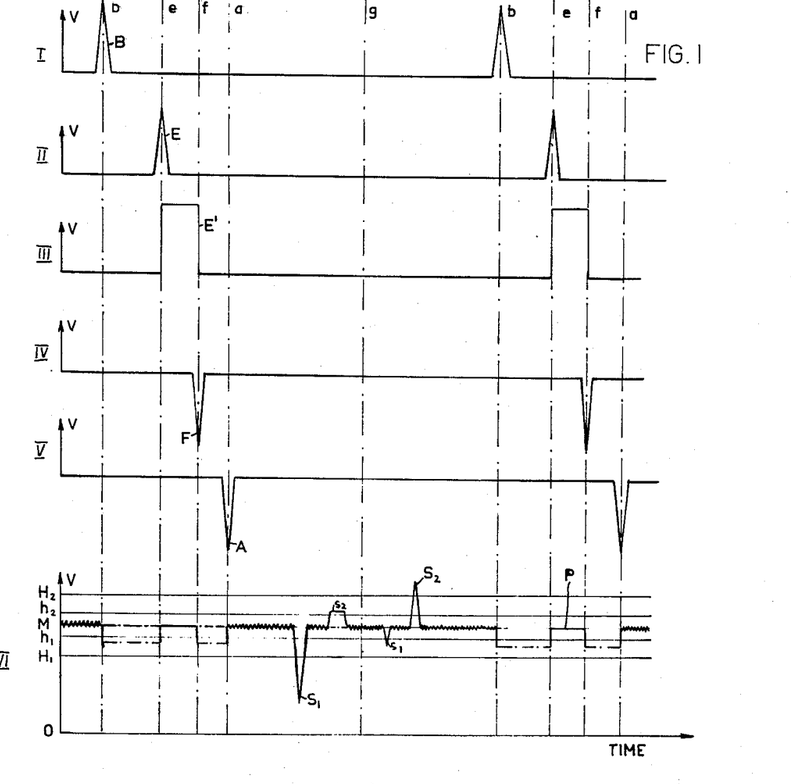
FIG. 1 is a set of graphs illustrating the principle of operation or a sheet-scanning system according to the invention.

Reference will first be made to FIG. 1 which consists of six correlated graphs respectively designated I to VI. The abscissa common to all these graphs represents time, their individual ordinates denoting voltages. Certain instants in the course of a scanning cycle have been designated $a$, $b$, $e$, $f$, and $g$; the interval $a$—$a$, $b$—$b$ etc. corresponds to the length of a cycle.

It will be assumed that the luminous spot at instant $a$ begins to appear in full size on the sheet surface to be tested, passes the center line of that surface at instant $g$, begins to leave at instant $b$, impinges upon the reference strip of constant brightness at instant $e$, and begins to move off that strip at instant $f$.

In graph VI there is indicated at line 0 the level of zero reflection, i.e. the output of the main photoelectric receiver or receivers when the scanning light source is turned off or when the reflecting surface is completely black. Normally, when reflections are received from a sheet to be tested, this output oscillates about a mean level M whose polarity relative to zero line 0 will be assumed as positive. These oscillations occur between the instants $a$ and $b$ and, as long as the sheet is free from imperfections, will have amplitudes lying well within a range defined by a lower threshold $h_1$ and an upper threshold $h_2$.

In a relatively simple embodiment of the invention only the pulses surpassing the threshold $h_1$ are of interest and are used for signaling defective sheets. In another embodiment, more fully disclosed hereinafter in the description of FIG. 5, the pulses surpassing the threshold $h_2$ are also used. In the latter case the imperfections to be detected may give rise to either positive or negative pulses. Negative pulses $s_1$, $S_1$ occur when a dark (grey or black) area is scanned; positive pulses $s_2$, $S_2$ are the result of weaknesses or perforations in the sheet which are traversed by light from the auxiliary source. The signal pulses $s_1$, $s_2$ surpass the thresholds $h_1$, $h_2$, respectively, but do not exceed the cutoff levels $H_1$, $H_2$; a succession of such pulses (of either polarity) during the scanning of a single sheet may, however, result in a cumulative amplitude greater than the voltage difference $H_2$—$M$ or $M$—$H_1$ to produce an output signal indicative of a defective sheet. Signal pulses $S_1$ and $S_2$, on the other hand, are in themselves sufficient to give rise to such a defect indication.

The end of the scanning sweep at instant $b$ marks the beginning of an interval which may be considered as a flyback period even though, in the case of a rotating mirror, the scan is not reversed but a new beam approaches the sheet from one side while the old beam continues to move away from it on the other. During this flyback interval the amount of light energy picked up by the receiving means will depend on the surface characteristics of neighboring objects which are then swept by the beam or beams, though the ability of such objects to reflect light toward the nearest photoelectric receiver will usually be small so that the amplitude of the voltage in graph VI may be expected to dip. It should be understood, however, that the portions of this voltage indicated in dot-dash lines between instants $b$ and $e$ as well as between instants $f$ and $a$ do not necessarily represent actual pulse amplitudes.

Between the instants $e$ and $f$ the light from the scanning source (e.g. the rays thereof which form the new beams) impinges upon the reference strip of substantially constant brightness; this produces a voltage plateau P which is nearly free from fluctuations and, if the surface of the strip generally matches that of the sheet to be tested, will lie substantially at the mean voltage level M as shown. Between the instants $f$ and $a$ the beam passes from the reference strip onto the adjoining sheet to start a new scanning cycle.

Just before the beam leaves the scanned sheet, i.e. at instant $b$, we prefer to generate a pulse shown as a positive spike I, which marks the leading edge of a blanking pulse B, graph I, adapted to suppress the output of the detector until a new beam strikes the sheet to be tested. When this new beam falls fully upon the reference strip at instant $e$, a positive spike E, graph II, is generated; this spike is next broadened into a rectangular pulse E' whose duration equals the time of passage of the beam across the reference strip. As the beam starts to leave that strip, i.e. at instant $f$, a negative spike F is produced as illustrated in graph IV. Spike F is reproduced after a short delay at instant $a$ as a pulse A, graph V, which terminates the blanking pulse or generates an unblocking pulse persisting to instant $b$.

Figure 2:
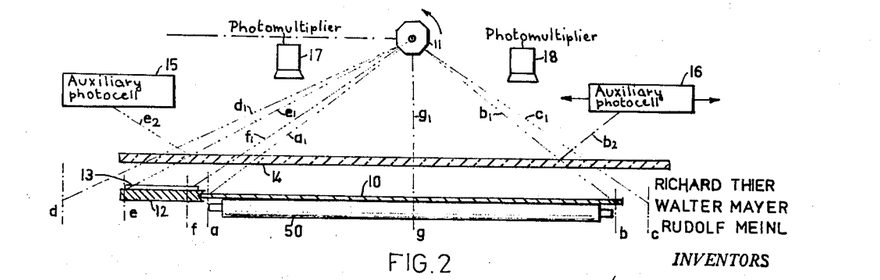
FIG. 2 is a diagrammatical view of the optical part of the scanning system.

FIG. 2 illustrates the manner in which the pulses of FIG. 1 are generated. In this figure the sheet 10 to be tested travels alongside a reference strip 13 of constant brightness; one of the feed rollers used for advancing the sheet 10 is shown at 50. The movement of the scanning beam, which occupies various positions $a_1$ to $g_1$ at corresponding instants $a$ to $g$ in conformity with the designations used in FIG. 1, is produced by a rotating mirror 11. An abutment rail 12, supporting the strip 13, fixedly guides the left-hand edge of sheet 10 and defines its entrance edge which the oncoming beam passes at instant $a$; the opposite exit edge of the sheet, whose location may vary with the width thereof, is traversed at instant $b$. The extreme outgoing and incoming beam positions are shown $c_1$ (instant $c$) and $d_1$ (instant $d$), respectively. Positions $e_1$ and $f_1$ occur at instants $e$ and $f$ as the beam enters upon and leaves the reference strip 13. At $g_1$ is shown the mid-position of the beam, occurring at instant $g$.

A transparent glass plate 14 lies between sheet 10 and mirror 11 to intercept the scanning beam and to reflect some of its rays. In beam position $e_1$ a portion $e_2$ of it is reflected onto an auxiliary photocell 15 to produce the positive spike E of FIG. 1 (II). In beam position $b_1$ a similar deflection $b_2$ energizes a photocell 16 to produce the spike B of FIG. 1 (I). The position of cell 16 is laterally adjustable, as indicated by the arrows, to ensure exact coincidence of pulse B with the passing of the beam across the right-hand edge of sheet 10. The reflections at plate 14, though occurring prior to those at surfaces 10 and 13, are of relatively minor intensity and may therefore properly be described as "secondary."

The principal photoelectric receivers, which pick up scattered reflections of the moving beams from the surfaces of strip 13 and sheet 10, are shown at 17 and 18.

They may comprise conventional photomultiplier tubes suitably interconnected in cascade as more fully described in the aforementioned Patent No. 3,023,900.

The use of a second auxiliary photocell 16 to determine the end of the scanning sweep is not indispensable since a preferably adjustable timing circuit, triggered for example by pulse E produced by cell 15, may be substituted therefor. Such timing circuit may, on the other hand, also be used to generate a switching signal at instant $g$ for the purpose of alternately scanning the two longitudinal halves of the sheet whereby, again as fully described in the patent referred to, sheets which are defective in only one half or the other may be segregated from one another, and from sheets that are defective in both halves, by the sorting system.

Figure 3:
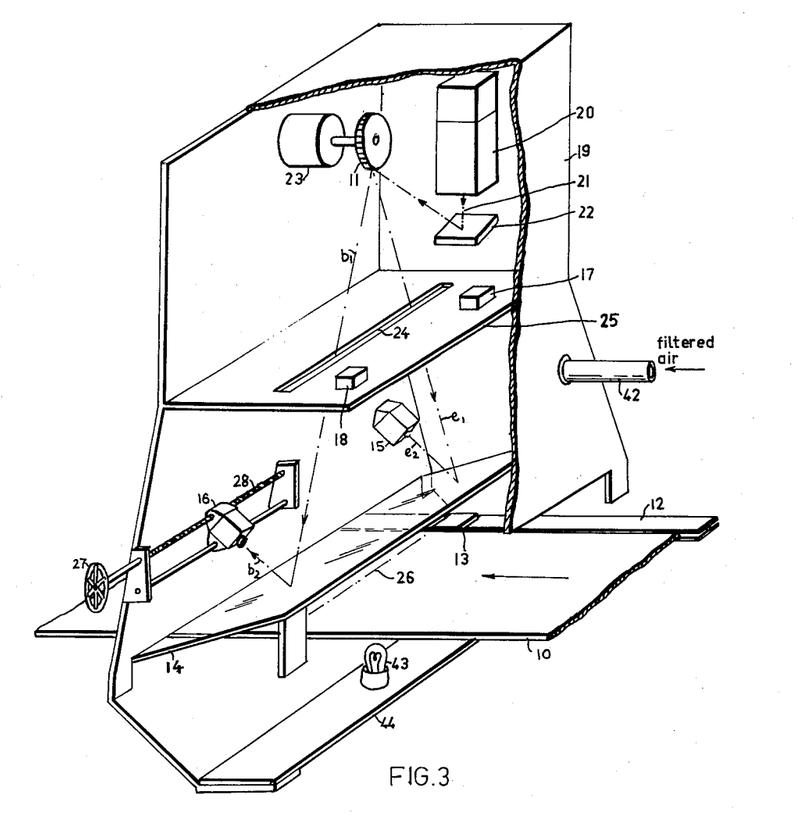
FIG. 3 is a perspective view of a scanner embodying the invention.

A physical embodiment of the system diagrammatically illustrated in FIG. 2 is shown in FIG. 3. A housing 19 encloses a smaller container 20 in which there is disposed a suitable light source, such as an electric lamp, together with a lens system for focusing the light of this source into a beam 21. A stationary mirror 22 directs that beam onto the facets of rotating mirror 11 which is driven by an electric motor 23. A horizontal partition 25 in housing 19 carries the photomultipliers 17 and 18 while being provided with a slot 24 for the passage of the reflected beam. The latter, which strikes the reference strip 13 in its position $e_1$ and reaches the position $b_1$ after traversing the sheet 10 along scanning line 26, also passes through the glass plate 14 which advantageously forms a window in a second partition (not shown) whereon it is supported. The latter partition closes the housing 19 against the surrounding atmosphere; filtered air under slight pressure may be admitted into the housing through a tube 42 to counteract the penetration of dust into the interior thereof.

Underneath the partition 25, which effectively shields the photomultipliers 17 and 18 from parasitic reflections within the upper part of the housing, there is located the stationary photocell 15 as well as the movable photocell 16; the latter is shown adjustably mounted on a lead screw 28 controlled by a hand wheel 27 outside the housing. Rail 12, supporting the strip 13, extends beyond housing 19 on opposite sides thereof.

Figure 4:
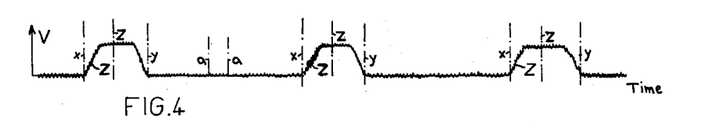
FIG. 4 is a further graph illustrating another aspect of the operation of the system.

FIG. 3 also shows an auxiliary light source 43, supported on a shelf 44 underneath the path of the sheet 10, whose rays impinge upon the photomultipliers 17 and 18 when there is no sheet present at the location of scanning line 26. The effect of this arrangement is illustrated in the graph of FIG. 4 which shows a series of positive pulses Z each occurring between a time $x$, the instant when the scanning beam fades off the transverse trailing edge of an outgoing sheet, and a time $y$, the instant when the beam alights on the transverse leading edge of an incoming sheet. The pulses Z, which reach their peak at instants $z$ when the inter-sheet gaps register with the scanning line 26 of FIG. 3, serve to trigger the discharge of an integrating stage which is used to accumulate the smaller defect-signal pulses $s_1$, $s_2$, FIG. 1 (VI), indicating minor imperfections in the sheet surface.

The sheet-scanning interval $z$—$z$ encompasses, of course, a large number of line-scanning intervals $a$—$a$ as is also apparent from FIG. 4.

Figure 5:
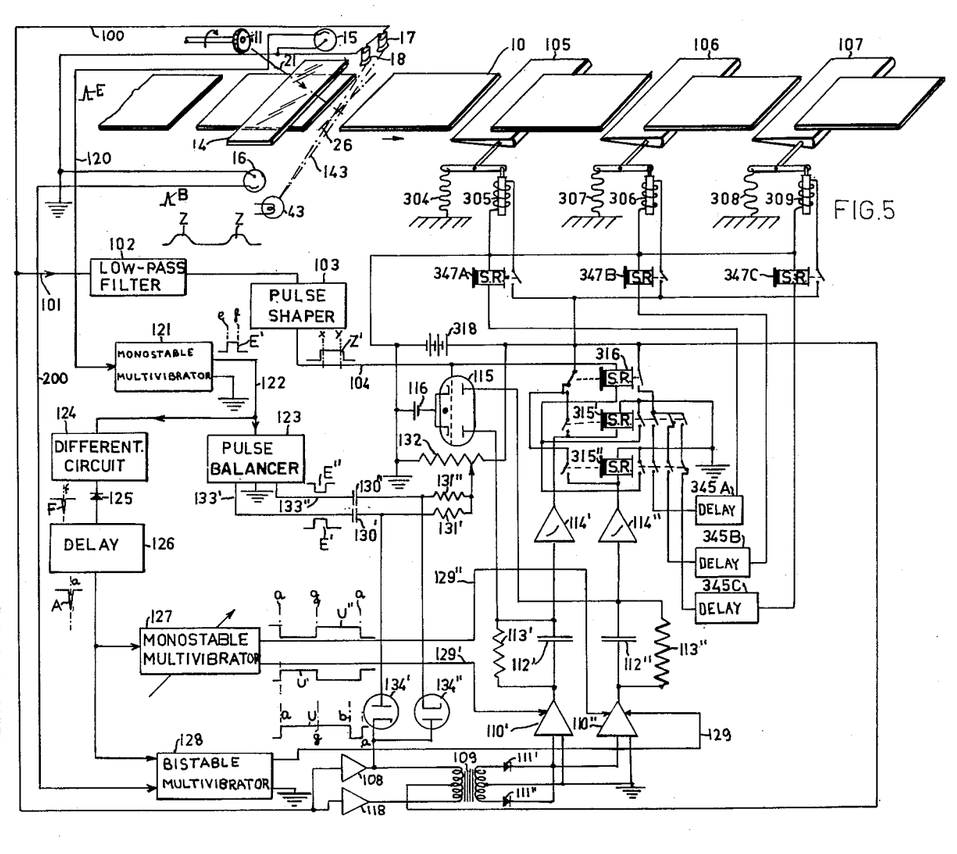
FIG. 5 is a circuit diagram of a photoelectric sorting system incorporating a scanner as shown in FIG. 3 and operating on the principles described in connection with FIGS. 1, 2 and 4.

Reference will now be made to FIG. 5 for a description of the electric circuits of our improved system and of the mode of operation thereof.

FIG. 5 shows schematically the principal elements contained within the housing 19 of FIG. 3, i.e. the rotating mirror 11, the main photoelectric receivers 17, 18, the glass plate 14 and the auxiliary photocells 15 and 16. The auxiliary light source 43, which directs its rays 143 onto the receivers 17 and 18 through the gap between successive sheets 10 when this gap registers with the scanning line 26, is also shown.

The sheets 10, traveling from left to right as indicated by the arrow, pass after testing over a series of baffles 105, 106, 107 controlled by respective solenoids 305, 306, 309 which, when energized, rotate these baffles clockwise against the force of restoring springs 304, 307, 308. These solenoids are energizable by a source of direct current, here shown as battery 318, which may also be considered as part of the power supply for the several amplifiers and of the circuit elements hereinafter described. The lamp 43 and the lamp (not shown) producing the beam 21 may also be energized from the same power supply.

The energizing circuits for solenoids 305, 306, 309 include armatures of respective slow-releasing relays 347A, 347B, 347C which in turn have operating circuits controlled by two slow-releasing selector relays 315′, 315″ and a timing relay 316. These operating circuits further include delay networks 345A, 345B, 345C, respectively, which cause the associated control relays 347A, 347B, 347C to operate at staggered intervals so selected that the baffles 105–107 respectively controlled thereby will function to deflect a defective sheet from its path by swinging about its pivot at the precise moment when the leading edge of that sheet approaches the particular baffle. For his purpose the timing relay 316 is arranged to respond to the pulses Z (see also FIG. 4) which occur during the scanning of the inter-sheet gap, the delays introduced by networks 345A, 345B, 345C thus corresponding substantially to the transit time of the sheets from scanning line 26 to a location just ahead of baffles 105, 106 and 107, respectively. The delay networks may include, for example, a magnetic recording tape in which the relay-operating pulses are stored for different periods as more fully described in the aforementioned Patent No. 3,023,900.

The output of photomultipliers 17 and 18 is applied to a conductor 100 from which a branch 101 extends to a low-pass filter 102 designed to suppress all the high-frequency oscillations occurring within a line-scanning interval, as illustrated in FIG. 1 (VI), as well as the line-scanning oscillations themselves whose period corresponds to an interval $a$—$a$ in FIG. 4. The rounded pulses Z coming from filter 102 are fed to a shaping circuit 103 which converts them into rectangular pulses Z′ delivered to a conductor 104 to which the winding of relay 316 is connected. Conductor 100 also leads to the inputs of two push-pull-connected amplifiers 108, 118 which feed an output transformer 109 and together with it constitute a discriminator stage; the secondary winding of this transformer feeds in parallel two amplifiers 110′, 110″ by way of a pair of rectifiers 111′, 111″. Each amplifier 110′, 110″ works into a respective integrating circuit, consisting of a condenser 112′, 112″ shunted by a resistor 113′, 113″, respectively, and through it into a clipper stage represented by two amplifiers 114′, 114″ with a sharp bend in their characteristic. The windings of relays 315′ and 315″ are respectively connected in the output circuits of clipping amplifiers 114′ and 114″.

Each of the slow-releasing selector relays 315′ and 315″ is provided with a respective holding armature (left) adapted to maintain it energized over the left-hand armature and back contact of relay 316 whenever the associated clipping amplifier 114′, 114″ receives a pulse signal of an amplitude sufficient to overcome the bias of this amplifier. Each selector relay also has four additional armatures (right) which, at the instant when timing relay 316 is energized by pulse Z′ to attract its right-hand armature, complete an energizing circuit for one of the control relays 347A–347C by way of the respective delay network 345A–345C. It will be noted that these armatures are so arranged that energization of relay 315′ alone operates the relay 347C and, therefore, the baffle 107; energization of relay 315″ alone operates the relay 347B and, thus, the baffle 106; and energization of both relays 315′ and 315″ operates the relay 347A and, with it, the baffle 105. It will also be noted that the relay 316 cannot operate until at least one of the selector relays 315′ 315″ has attracted its inner right-hand armature.

The resistors 113', 113" of the integrating circuits associated with amplifiers 114', 114" are shunted by a discharge device here shown as a dual triode 115 normally biased to cutoff by a small battery 116. The grids of the two triode sections of tube 115 are connected to conductor 104 so as to be driven positive by the pulse Z' whereby the condensers 112', 112" are discharged at the end of a sheet-scanning cycle, i.e. in the position illustrated in FIG. 5.

The output of auxiliary photocell 15, in the form of a positive spike E, is delivered to a conductor 120 connected to the input of a monostable multivibrator (sometimes referred to as "univibrator") 121 which produces the flattened pulse E'. The latter pulse is transmitted via a lead 122 to a pulse balancer 123 and, in parallel therewith, to a differentiation circuit 124 which derives from pulse E' the negative spike F passed by a rectifier 125; this spike, after traversing a delay network 126, is transmitted as delayed spike A to an adjustable monostable multivibrator 127 and, in parallel therewith, to one input of a bistable multivibrator 128. The other input of multivibrator 128 is connected via lead 200 to auxiliary photocell 16; thus, this multivibrator is successively triggered by spike A from differentiation circuit 124 and by spike B from photocell 16 to produce a positive unblocking pulse U whose duration corresponds substantially to the interval $a$—$b$ within which the scanning beam sweeps across the surface of sheet 10. Pulse U is applied by a lead 129 to a control electrode of amplifier 110" which is thus blocked during the interval $b$—$a$. The positions of photocells 15 and 16 are so selected that the sweep of the beam becomes effective only as long as the luminous spot thereof impinges fully upon the sheet surface.

The output of monostable multivibrator 127 is a pair of successive unblocking pulses U', U" which together extend over the full line-scanning cycle $a$—$a$. Pulse U', whose leading edge coincides with that of pulse U, terminates at the mid-point $g$ of the sweep; pulse U" starts at instant $g$ and ends at the beginning $a$ of the next cycle. Unblocking pulse U', appearing on a lead 129' in the output of multivibrator 127, and its complement U", appearing on a lead 129" in that output, are respectively applied to control electrodes of amplifiers 110' and 110" which are non-conducting except when the respective unblocking pulse is in existence. Thus, the combination of pulses U, U' and U" insures that amplifiers 114' and 114" conduct only during the intervals $a$—$g$ and $g$—$b$, respectively.

Pulse balancer 123 forms part of a clamping stage which includes a pair of condensers 130', 130" connected over respective series resistors 131', 131" to a source of positive voltage here shown as a tap on a potentiometer 132 bridging the battery 318. The square pulse E' is fed to condenser 130' by an output lead 133' of balancer 123, the negative image E" of that pulse being simultaneously applied over an output lead 133" to a condenser 130". The output of amplifier 108 is connected through a diode 134' to the junction of condenser 130' with resistor 131' and, in parallel therewith, through a relatively inverted diode 134" to the junction of condenser 130" with resistor 131".

The operation of the system shown in FIG. 5 will now be described.

At instant $y$ (FIG. 4) a conveyor system not shown in FIG. 5, of which the roller 50 of FIG. 2 is illustrative, presents the leading edge of a sheet 10 to the oscillating beam 21 which scans the line 26 through the glass plate 14. At this moment the condensers 112' and 112" of the integrating stage are fully discharged as the dual triode 115 has just ceased to conduct under the influence of pulse Z'. The termination of that pulse also has restored to normal any of the relays 315', 315", 316 that may have previously been operated, with consequent normalization of the positions of baffles 105, 106, 107 at the end of their respective delay periods, so that the system is ready to begin the testing of the oncoming sheet. The pulse shaper 103 is so designed that pulse Z' is a little broader than the original pulse Z produced by the lamp 43, this lamp being so positioned with respect to scanning line 26 that the leading edge of pulse Z' coincides with the last full line-scanning sweep of beam 19 on an outgoing sheet, i.e. slightly precedes the instant $x$, while its trailing edge occurs as the beam impinges in full upon the next sheet to scan the first line thereof, thus shortly after the instant $y$. Since the presence of pulse Z' effectively grounds the inputs of clipping amplifiers 114' and 114", the clipper stage is inoperative during the entire interval separating two sheet-scanning periods.

As the new sheet 10 advances past the scanning line 26, the first line-scanning cycle is initiated by the energization of photocell 15 in beam position $e_1$ (FIG. 2). The resulting pulse E on lead 120 reverses the condition of univibrator 121 so as to give rise to the square pulse E'. This pulse, shown to be of positive polarity, is matched by a negative pulse E" of equal amplitude and duration produced by the balancer 123. The existence of the two pulses E' and E" on leads 133' and 133", respectively, loads the condensers 130', 130" at the precise time when the reflections from strip 13 (FIGS. 2 and 3) are picked up by the receivers 17 and 18 to produce the plateau voltage P, FIG. 1 (VI), in the outputs of amplifiers 108 and 118. With the tap of potentiometer 132 adjusted to a positive voltage approximately corresponding to level M in FIG. 1 (VI), the potentials at the respective junctions of condensers 130' and 130" with resistors 131' and 131" will be generally symmetrical with respect to the output voltage of amplifier 108 at this instant. The condensers 130' and 130" are of sufficiently high capacitance to pass the pulses E' and E" without substantial distortion. These pulses also traverse the diodes 134' and 134", respectively, to the extent permitted by the biasing potentials on the condensers, so that upon their cessation the plate of diode 134' and the cathode of diode 134" will have voltages which are respectively negative and positive relatively to the plateau voltage P. The adjustment of potentiometer 132 is not critical since the setting of its tap determines only the rate at which the condensers discharge; this discharge will in any event be relatively slow since the impedance combinations 130', 131' and 130", 131" should have time constants which are large compared with the duration of a line-scanning cycle.

The plate voltage of diode 134' and the cathode voltage of diode 134" respectively correspond to the thresholds $h_1$ and $h_2$ of FIG. 1 (VI). The relative separation of these voltages is determined solely by the normally constant amplitudes of pulses E' and E" whereas their absolute magnitudes, i.e. the location of the mean voltage M therebetween, will be determined by the plateau voltage P. It will thus be apparent that the elements 130', 131', 134' and 130", 131", 134" operate as a clamping stage serving to freeze, under the control of the reflections from reference strip 13, the amplitude levels which should not be exceeded by the output of receivers 17 and 18 during the scanning of a normal sheet surface; the voltage P serves as a comparison pulse which establishes the reference voltage maintained by the clamping stage in the course of the scan.

As the pulse E' decays, differentiation circuit 124 produces the spike F which is shifted at delay network 126 to become the trigger pulse A for multivibrators 127 and 128 which acts as an enabling pulse for the clamping stage. Unblocking pulses U and U' come into existence to render the amplifier 110' conductive and to remove negative bias from one of the input leads, 129, of amplifier 110"; the latter, however, remains blocked since its other input lead, 129", is still biased to cutoff.

The reflections now picked up by receivers 17 and 18 energize the discriminator stage which remains balanced as long as the output voltages of its amplifiers 108, 118 do not fall below lower threshold $h_1$ or rise above upper threshold $h_2$ of FIG. 1 (VI). When an imperfection (dark spot) is encountered to lower the output voltages of these amplifiers below the first limit, diode 134' conducts and transformer 109 becomes unbalanced to apply a positive pulse to amplifier 110' and thereby to clipping amplifier 114'. If the pulse is large enough to drive the operating point of amplifier 114' above the bent portion of its characteristic, i.e. if it extends beyond the cutoff level $H_1$ in FIG. 1 (VI) as is the case with pulse $S_1$, selector relay 315' is energized and locks over its left-hand armature and that of control relay 316; nothing further happens until relay 316 operates at the end of the sheet-scanning interval, in response to pulse Z', whereupon relay 347A or 347C is operated (dependent upon whether or not relay 315'' had also been locked energized) to deflect the defective sheet into a receptacle (not shown) for sheets with imperfections in their left-hand half (as viewed in FIG. 2) or one for sheets with imperfections in both halves; had only the relay 315'' been energized, relay 347B would have responded to direct the sheet into a receptacle for sheets defective in their right-hand half.

If, however, the pulse had been insufficient to overcome the bias of clipping amplifier 114', its only immediate effect would have been the storage of a charge on condenser 112', the magnitude of this charge depending upon the duration of the pulse as well as its amplitude. A succession of such pulses, occurring in the same or different line sweeps during a single sheet-scanning period, thus builds up the charge of the condenser to a value which ultimately may suffice to trigger the clipping amplifier into energization of the associated selector relay. It will thus be apparent that the defect indicator represented by amplifiers 110', 110'' and 114', 114'' responds to a single major defect, such as a small black spot, in essentially the same manner as to a plurality of minor defects, such as a large grey area or a multiplicity of smaller grey spots.

When the output voltage of discriminator 108, 118 is higher than the upper limit $h_2$, as might be the case if the scan encounters a transparency in the sheet, diode 134'' conducts and unbalances the transformer 109 to produce a signal pulse in the input of amplifier 114'. Again, if the pulse is large as shown at $S_2$, i.e. if it surpasses the upper cutoff level $H_2$ in FIG. 1 (VI), amplifier 114' conducts to energize the relay 315' with the same result as before; if it is small, as illustrated for the pulse $s_2$, a charge is again stored on condenser 112' which in combination with similar charges from other pulses of either polarity may eventually trigger the operation of relay 315'.

At instant $g$ the scanning beam 21 sweeps across the center line of sheet 10. Independently thereof, but at substantially the same time, univibrator 127 returns to its stable condition and produces the pulse U'' on lead 129'' in lieu of pulse U' on lead 129'. This operation blocks the amplifier 110' and unblocks the amplifier 110'' whereupon any subsequent unbalance in the output of amplifiers 108, 118 produces a pulse which may energize the clipping amplifier 114'' to operate the relay 315'' or may charge the condenser 112'' preparatorily to such operation. It will thus be seen that the two sheet halves are tested independently of each other.

Just before the beam 21 leaves the sheet 10, photocell 16 produces the pulse B which throws the multivibrator 128 into its alternate stable condition and terminates the pulse U. This cuts off the amplifier 110'' so that the output of the entire detector stage is now blanked until the pulses U and U' recur at the beginning of the next line sweep. The condensers 112', 112'', however, retain their charges, if any, until an end-of-test pulse Z' discharges them through the double triode 115.

The foregoing description indicates that the location of voltage level M in FIG. 1 (VI) is determined photoelectrically, by the operation of the clamping stage 130', 130'' and 131', 131'' in response to reflections from reference strip 13, whereas the voltage differences $h_2-M$, $M-h_1$ as well as the voltage differences $H_2-h_2$ and $h_1-H_1$ are established by electric means only, the former by the output amplitude of pulse balancer 123, the latter by the bias of clipping amplifiers 114' and 114''. If the intensity of the beam 21 should vary, e.g. decrease upon the aging of the lamp producing it, the overall level of the output of receivers 17 and 18 would change correspondingly and the comparison voltage P, keeping pace with this change, would properly shift the limits $h_1$, $h_2$ as well as $H_1$, $H_2$. Should, on the other hand, variations in the electric parameters of the system (e.g. in the supply voltage) affect the amplitudes of the signal pulses, the aforementioned voltage differences would follow suit so that the overall operation of the system would remain substantially unaltered.

Naturally, the subdivision of a sheet into two separately scanned halves has been shown only by way of example; the sheets may be scanned in their entirety, or in different subdivisions, and the switchover may be timed photoelectrically (as by photocell 16) and/or purely electrically (as by univibrator 121) as desired. Thus, our improved system admits of many modifications and adaptations without departing from the spirit and scope of the invention as defined in the appended claims; some of its features are applicable, for example, to systems in which imperfections on a sheet are detected solely by translumination instead of being at least partially ascertained by reflection, as is the case in the embodiment specifically described and illustrated. It will also be understood that the baffles 105 to 107 are representative of any means for indicating the detection of an imperfection by the photoelectric transducers 17, 18. Furthermore, in systems in which possible variations of light intensity are not considered a problem, the potential to be stored in the clamping stage may be derived from a fixed or adjustable source of reference voltage other than an auxiliary photoelectric receiver as hereinabove described.

We claim:

1. An apparatus for detecting optically ascertainable imperfections on sheet material, comprising feed means for advancing the sheet material to be tested along a predetermined path, a light source producing a narrow beam, scanning means for repetitively sweeping said beam across said path at a rate which is high compared with the speed of advance of said sheet material, photoelectric transducer means operatively aligned with said source for responding to light from said beam directed toward said transducer means by said sheet material, said transducer means being adapted to produce an output voltage substantially proportional to the received light, reference means for periodically directing the light of said source to said transducer means over a path independent of said sheet material whereby an electric comparison pulse is produced, said reference means comprising an object with a reflecting surface of substantially constant brightness positioned in the path of said beam alongside the path of said sheet material, circuit means including a clamping stage for maintaining a reference voltage corresponding to said comparison pulse throughout the sweep of the beam across said sheet material, detector means connected to said transducer means and to said clamping stage for responding to a predetermined minimum deviation of said output voltage from said reference voltage, indicator means controlled by said detector means for signaling an imperfection upon the occurrence of said deviation, and timer means synchronized with said scanning means for transmitting to said clamping stage, concurrently with the passage of said beam across said reflecting surface, an enabling pulse rendering said clamping stage susceptible to said comparison pulse.

2. An apparatus according to claim 1 wherein said timer means comprises a photoelectric receiver positioned to respond to secondary reflections of said beam at a predetermined stage of its sweep.

3. An apparatus for detecting optically ascertainable imperfections on sheet material, comprising feed means for advancing the sheet material to be tested along a predetermined path, a light source producing a narrow beam, scanning means for repetitively sweeping said beam across said path at a rate which is high compared with the speed of advance of said sheet material, photoelectric transducer means operatively aligned with said source for responding to light from said beam directed toward said transducer means by said sheet material, said transducer means being adapted to produce an output voltage substantially proportional to the received light, reference means for periodically directing the light of said source to said transducer means over a path independent of said sheet material whereby an electric comparison pulse is produced, said reference means comprising an object with a reflecting surface of substantially constant brightness positioned in the path of said beam alongside the path of said sheet material, circuit means including a clamping stage for maintaining a reference voltage corresponding to said comparison pulse throughout the sweep of the beam across said sheet material, detector means connected to said transducer means and to said clamping stage for responding to a predetermined minimum deviation of said output voltage from said reference voltage, indicator means controlled by said detector means for signaling an imperfection upon the occurrence of said deviation, and timer means synchronized with said scanning means for transmitting to said detector means a blocking pulse blanking the output thereof at all times except during the sweep of said beam across the sheet material.

4. An apparatus according to claim 3 wherein said timer means comprises photoelectric receiver means positioned to respond to secondary reflections of said beam at a predetermined stage of its sweep.

5. An apparatus according to claim 4 wherein said receiver means comprises a first and a second photocell respectively positioned to receive said reflections prior to impingement of the beam upon said sheet material and just before the end of its sweep across said sheet material.

6. An apparatus for detecting optically ascertainable imperfections on sheet material, comprising feed means for advancing the sheet material to be tested along a predetermined path, a light source producing a narrow beam, scanning means for repetitively sweeping said beam across said path at a rate which is high compared with the speed of advance of said sheet material, photoelectric transducer means operatively aligned with said source for responding to light from said beam directed toward said transducer means by said sheet material, said transducer means being adapted to produce an output voltage substantially proportional to the received light, reference means for periodically directing the light of said source to said transducer means over a path independent of said sheet material whereby an electric comparison pulse is produced, said reference means comprising an object with a reflecting surface of substantially constant brightness positioned in the path of said beam alongside the path of said sheet material, circuit means including a clamping stage for maintaining a reference voltage corresponding to said comparison pulse throughout the sweep of the beam across said sheet material, detector means connected to said transducer means and to said clamping stage for responding to a predetermined minimum deviation of said output voltage from said reference voltage, indicator means controlled by said detector means for signaling an imperfection upon the occurrence of said deviation, first timer means synchronized with said scanning means for transmitting to said clamping stage, concurrently with the passage of said beam across said reflecting surface, an enabling pulse rendering said clamping stage susceptible to said comparison pulse, and second timer means synchronized with said scanning means for transmitting to said detector means a blocking pulse blanking the output thereof at all times except during the sweep of said beam across the sheet material.

7. An apparatus according to claim 6 wherein at least one of said timer means comprises photoelectric receiver means positioned to respond to secondary reflections of said beam at a predetermined stage of its sweep.

8. An apparatus according to claim 7 further comprising a transparent plate interposed between said scanning means and said reflecting surface, said sheet material being adapted to pass on the side of said plate remote from said scanning means, said receiver means being positioned on the same side of said plate as said scanning means for illumination by secondary reflections from a surface of said plate.

9. An apparatus according to claim 8 wherein said receiver means comprises a first photocell fixedly positioned at a location facing said reflecting surface and a second photocell adjustably positioned at a location facing an edge of the sheet material remote from said reflecting surface.

10. An apparatus for detecting optically ascertainable imperfections on sheet material, comprising feed means for advancing the sheet material to be tested along a predetermined path, a light source producing a narrow beam, scanning means for repetitively sweeping said beam across said path at a rate which is high compared with the speed of advance of said sheet material, photoelectric transducer means operatively aligned with said source for responding to light from said beam directed toward said transducer means by said sheet material, said transducer means being adapted to produce an output voltage substantially proportional to the received light, reference means for periodically directing the light of said source to said transducer means over a path independent of said sheet material whereby an electric comparison pulse is produced, circuit means including a clamping stage for maintaining a reference voltage corresponding to said comparison pulse throughout the sweep of the beam across said sheet material, detector means connected to said transducer means and to said clamping stage for responding to a predetermined minimum deviation of said output voltage from said reference voltage, and indicator means controlled by said detector means for signaling an imperfection upon the occurrence of said deviation; said detector means comprising a discriminator stage adapted to produce defect signals in response to output voltages surpassing said predetermined minimum deviation, the amplitudes of said defect signals varying with the deviation of said output voltages from said reference voltage, a clipper stage responsive to defect signals of a predetermined minimum amplitude only, and integrating means inserted between said discriminator stage and said clipper stage for accumulating defect signals of smaller amplitudes from said discriminator stage and actuating said clipper stage upon the attainment of said predetermined minimum amplitude by the accumulated defect signals.

11. An apparatus according to claim 10 further comprising pulsing means controlled by said feed means for periodically discharging said integrating means at intervals which are large compared with the duration of a sweep of said beam across said sheet material.

12. An apparatus for detecting optically ascertainable imperfections on a succession of sheets following one another with an intervening gap, comprising feed means for advancing said sheets along a predetermined path, a light source producing a narrow beam, scanning means for repetitively sweeping said beam across said path at a rate which is high compared with the speed of advance of said sheets, photoelectric transducer means operatively aligned with said source for receiving light from said beam reflected by said sheets, said transducer means being adapted to produce an output voltage substantially proportional to the received light, reference means for periodically directing the light of said source to said transducer means over a path independent of said sheets whereby an electric comparison pulse is produced, circuit means including a clamping stage for maintaining a reference voltage corresponding to said comparison pulse throughout the sweep of beam across said sheets, detector means connected to said transducer means and to said clamping stage for responding to a predetermined minimum deviation of said output voltage from said reference voltage, indicator means controlled by said detector means for signaling an imperfection upon the occurrence of said deviation, and pulsing means controlled by said feed means for inactivating said detector means during alignment of said gap with the sweep of said beam; said pulsing means comprising an auxiliary light source positioned opposite said transducer means for illuminating the latter through said gap, and filter means connected to said transducer means for selecting from the output thereof a blanking pulse due to illumination by said auxiliary light source.

13. An apparatus according to claim 12 wherein said detector means comprises a discriminator stage adapted to produce defect signals in response to output voltages surpassing said predetermined minimum deviation, the amplitudes of said defect signals varying with the deviation of said output voltages from said reference voltage, a clipper stage responsive to defect signals of a predetermined minimum amplitude only, and integrating means inserted between said discriminator stage and said clipper stage for accumulating defect signals of smaller amplitudes from said discriminator stage and actuating said clipper stage upon the attainment of said predetermined minimum amplitude by the accumulated defect signals, said integrating means being connected to said filter means for periodic discharge by said blanking pulse.

14. An apparatus for detecting optically ascertainable imperfections on a succession of sheets following one another with an intervening gap, comprising feed means for advancing said sheets along a predetermined path, a light source producing a narrow beam, scanning means for repetitively sweeping said beam across said path at a rate which is high compared with the speed of advance of said sheets, photoelectric transducer means operatively aligned with said source for receiving light from said beam reflected by said sheets, said transducer means being adapted to produce an output voltage substantially proportional to the received light, detector means connected to said transducer means for responding to a predetermined minimum deviation of said output voltage from a reference voltage, indicator means controlled by said detector means for signaling an imperfection upon the occurrence of said deviation, said detector means comprising a discriminator stage adapted to produce defect signals in response to output voltages surpassing said predetermined minimum deviation, the amplitudes of said defect signals varying with the deviation of said output voltages from said reference voltage, a clipper stage responsive to defect signals of a predetermined minimum amplitude only, and integrating means inserted between said distriminator stage and said clipper stage for accumulating defect signals of smaller amplitudes from said discriminator stage and actuating said clipper stage upon the attainment of said predetermined minimum amplitude by the accumulated defect signals; pulsing means controlled by said feed means for periodically discharging said integrating means during alignment of said gap with the sweep of said beam, said pulsing means comprising an auxiliary light source positioned opposite said transducer means for illuminating the latter through said gap, and filter means connected to said transducer means for selecting from the output thereof a discharge pulse due to illumination by said auxiliary light source, said detector means being connected to said filter means for periodic inactivation by said discharge pulse; and timer means synchronized with said scanning means for also inactivating said detector means during the testing of a sheet in periods of non-alignment of said beam with said sheet.

15. An apparatus for detecting optically ascertainable imperfections on sheet material, comprising feed means for advancing the sheet material to be tested along a predetermined path, a light source producing a narrow beam, scanning means for repetitively sweeping said beam across said path at a rate which is high compared with the speed of advance of said sheet material, photoelectric transducer means operatively aligned with said source for responding to light from said beam directed toward said transducer means by said sheet material, said transducer means being adapted to produce an output voltage substantially proportional to the received light, voltage-source means synchronized with said scanning means for periodically producing an electric comparison pulse, circuit means including a clamping stage for maintaining a reference voltage corresponding to said comparison pulse throughout the sweep of the beam across said sheet material, said circuit means further including an auxiliary voltage source and timer means synchronized with said scanning means for momentarily rendering said source effective to energize said clamping stage between sweeps of said beam across said sheet material, detector means connected to said transducer means and to said clamping stage for responding to a predetermined minimum deviation of said output voltage from said reference voltage, and indicator means controlled by said detector means for signaling an imperfection upon the occurrence of said deviation.

16. An apparatus for detecting optically ascertainable imperfections on sheet material, comprising feed means for advancing the sheet material to be tested along a predetermined path, a light source producing a narrow beam, scanning means for repetitively sweeping said beam across said path at a rate which is high compared with the speed of advance of said sheet material, photoelectric transducer means operatively aligned with said source for responding to light from said beam directed toward said transducer means by said sheet material, said transducer means being adapted to produce an output voltage substantially proportional to the received light, voltage-source means synchronized with said scanning means for periodically producing an electric comparison pulse, circuit means including a clamping stage for maintaining a reference voltage corresponding to said comparison pulse throughout the sweep of the beam across said sheet material, said circuit means further including a source of light of constant brightness and timer means synchronized with said scanning means for momentarily rendering said source effective through the intermediary of said transducer means to energize said clamping stage between sweeps of said beam across said sheet material, detector means connected to said transducer means and to said clamping stage for responding to a predetermined minimum deviation of said output voltage from said reference voltage, and indicator means controlled by said detector means for signaling an imperfection upon the occurrence of said deviation.

References Cited in the file of this patent
UNITED STATES PATENTS

| | | |
|---|---|---|
| 2,566,399 | Bishop | Sept. 4, 1951 |
| 2,742,151 | Milford | Apr. 17, 1956 |
| 2,812,447 | MacMartin et al. | Nov. 5, 1957 |
| 2,985,839 | Brown | May 23, 1961 |
| 3,023,900 | Thier | Mar. 6, 1962 |

UNITED STATES PATENT OFFICE
CERTIFICATE OF CORRECTION

Patent No. 3,061,731                 October 30, 1962

Richard Thier et al.

It is hereby certified that error appears in the above numbered patent requiring correction and that the said Letters Patent should read as corrected below.

In the grant, line 2, and in the heading to the printed specification, line 6, for "Rüdolf Meinl", each occurrence, read -- Rudolf Meinl --; in the grant, lines 3 and 13, and in the heading to the printed specification, line 7, for "Zellsloffwerke", each occurrence, read -- Zellstoffwerke --.

Signed and sealed this 7th day of May 1963.

(SEAL)
Attest:

ERNEST W. SWIDER
Attesting Officer

DAVID L. LADD
Commissioner of Patents